(12) United States Patent
Downey

(10) Patent No.: US 11,863,320 B2
(45) Date of Patent: Jan. 2, 2024

(54) COMMUNICATION MEDIA SHARING AMONG DEVICES HAVING DISSIMILAR PHYSICAL LAYER WAVEFORMS

(71) Applicant: Dialog Semiconductor US Inc., Santa Clara, CA (US)

(72) Inventor: Walter Downey, Los Gatos, CA (US)

(73) Assignee: Dialog Semiconductor US Inc., Santa Clara, CA (US)

( * ) Notice: Subject to any disclaimer, the term of this patent is extended or adjusted under 35 U.S.C. 154(b) by 193 days.

(21) Appl. No.: 17/554,631

(22) Filed: Dec. 17, 2021

(65) Prior Publication Data

US 2022/0278773 A1 Sep. 1, 2022

Related U.S. Application Data

(60) Provisional application No. 63/154,059, filed on Feb. 26, 2021.

(51) Int. Cl.
*H04L 1/00* (2006.01)

(52) U.S. Cl.
CPC .......... *H04L 1/0083* (2013.01); *H04L 1/0061* (2013.01)

(58) Field of Classification Search
None
See application file for complete search history.

(56) References Cited

U.S. PATENT DOCUMENTS

| | | | |
|---|---|---|---|
| 7,817,614 B2 | 10/2010 | Yang et al. | |
| 8,001,256 B2 | 8/2011 | Loy et al. | |
| 8,929,317 B2 | 1/2015 | Hansen et al. | |
| 9,130,705 B2 | 9/2015 | Hansen | |
| 9,646,180 B2 | 5/2017 | Gordon et al. | |
| 10,079,709 B2 | 9/2018 | Sun et al. | |
| 11,729,782 B2 * | 8/2023 | Zhang | H04W 72/23 370/336 |
| 2003/0069995 A1 | 4/2003 | Fayette | |
| 2005/0138194 A1 | 6/2005 | Lu et al. | |
| 2019/0149365 A1 * | 5/2019 | Chatterjee | H04L 5/0094 370/329 |
| 2019/0215729 A1 * | 7/2019 | Oyman | H04L 65/1016 |
| 2019/0254013 A1 * | 8/2019 | Chang | H04L 5/00 |
| 2021/0051045 A1 * | 2/2021 | Sharma | H04L 12/66 |
| 2021/0194740 A1 * | 6/2021 | Aldana | H04W 72/1215 |

* cited by examiner

*Primary Examiner* — Mujtaba M Chaudry

(57) ABSTRACT

A method of communication on a shared media having a plurality of devices coupled thereto, the method including: forming a first portion including information on a property of a data signal and complying with a communication protocol; forming a second portion comprising data that differs from the information on the property provided in the first portion, where the second portion is non-compliant with the communication protocol; forming a third portion comprising an error check character to verify that the data signal is error free, where the error check character is purposefully set to be an incorrect value and otherwise complying with the communication protocol; and transmitting the data signal including the first, second, and third portions on the shared media, whereby a first of the plurality of devices that complies with the communication protocol is configured to reject the data signal due to the purposefully incorrect error check character.

20 Claims, 7 Drawing Sheets

COMMUNICATION MEDIA SHARING AMONG DEVICES HAVING DISSIMILAR PHYSICAL LAYER WAVEFORMS

RELATED APPLICATIONS

This application claims the benefit of U.S. Provisional Application No. 63/154,059, filed Feb. 26, 2021, and which is incorporated herein by reference in its entirety.

FIELD OF THE INVENTION

The present invention generally relates to the field of communication devices. More specifically, embodiments of the present invention pertain to devices and methods of communicating between devices on shared media.

BACKGROUND

When multiple devices share the same media and can receive each other's transmissions, typically all participating devices need to conform to the same communication protocol. This enables information to be exchanged between devices with a minimum loss of data. If one device cannot properly decode the data sent by another device, then no information can be exchanged, so the two devices must agree on the format of the data. Further, if two devices send data at the same time, then there is a collision and no devices may properly decode that data. As such, there must be some agreed upon rules for which a device is allowed to be the sole transmitter and for how long that device can transmit. Devices that share the same media, but are not compliant to the shared protocol can generally cause collisions when transmitting, which may result in undesirable loss of data between the shared protocol devices. Accordingly, it is typically preferable for all devices sharing the same media to also share a common communication protocol.

DETAILED DESCRIPTION OF EMBODIMENTS

Figure 1:
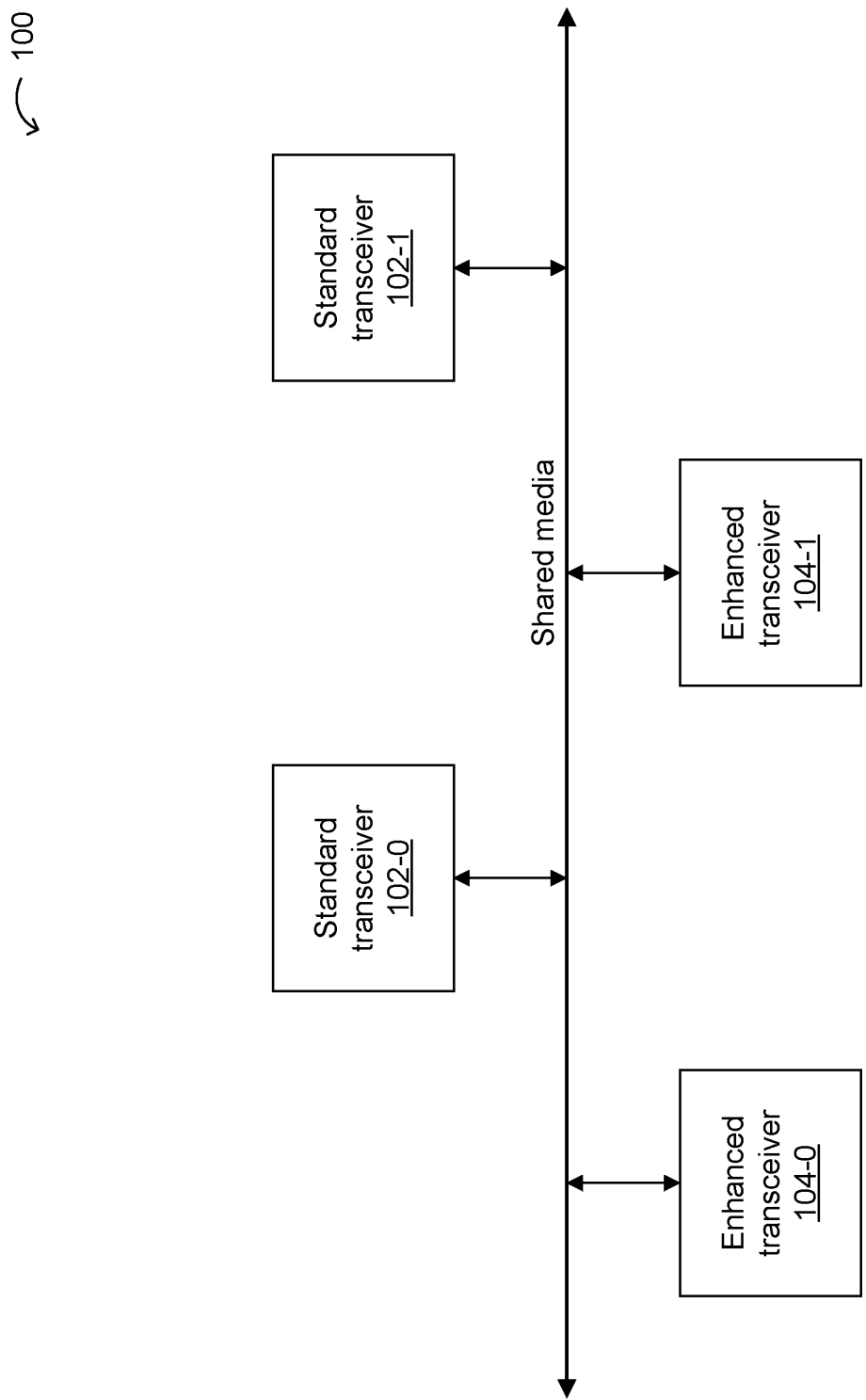
FIG. 1 is a block diagram of an example device and shared media arrangement, in accordance with embodiments of the present invention.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device, and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

One problem with having all devices that share the same media also use the same protocol is this can prevent new and more advanced devices from being added to the same media, whereby such advanced devices may be capable of sending data with higher performance (e.g., a higher data rate). Typically, if the data rate of a shared media channel needs to be increased, such as when the full capacity of the channel has been reached, all of the devices sharing the communication channel may need to be replaced with the new higher performance devices. However, this is a very expensive solution since there may be a large number of such devices sharing the same media in a system. It would more cost effective if a smaller set of devices (e.g., 2 or more devices) at a time could be replaced, in order to increase the channel capacity. In addition, if new capability needs to be added to a shared media that already has multiple devices operating thereon, the new devices might benefit from higher performance (e.g., a higher data rate), but these devices would typically instead be forced to use the same lower performance communication protocol as the existing devices that are already deployed on the shared media.

In particular embodiments, higher or "enhanced" performance devices can be added to media that is shared by other lower or "standard" performance devices that share the same communication protocol. As described herein, the "standard" format may indicate the physical layer and media access control (MAC) layer format used by such existing devices that are all connected to the same physical media and share the same common standard protocol, while the "enhanced" format may indicate a higher performance physical and MAC layer format that is not normally or otherwise compatible with the standard devices using the standard format protocol. While certain embodiments are applicable to devices (e.g., transceivers) on any shared media, including wired or wireless media types, the examples herein primarily utilize the IEEE 802.3 Ethernet protocol as the standard format protocol.

The IEEE 802.3 compliant devices have a MAC layer protocol for getting access onto the wire or communication media, while avoiding collisions as much as possible. In this protocol, transmissions are packetized with variable sized payloads of data of between 46 and 1500 bytes. The available modes for a device to get access to the media include carrier sense multiple access with collision detection (CSMA/CD) mode and beacon mode. For the CSMA/CD mode, devices may first listen for a transmitted preamble, and upon establishing that there is none, begin to transmit a packet using the standard format physical symbols. If the transmitting device determines that another device chose the same moment to also begin a transmission (i.e., collision detection), then that device may stop transmitting, in order to wait for another opportunity. For beacon mode, one node/device sharing the media and using the standard protocol may act as a unique master for the group of all compliant devices sharing the media. This master node periodically transmits a beacon to mark the beginning of a set of opportunities for all nodes to transmit data. Then, each device (e.g., with a unique identifier) may have its own time slot for transmitting data when no other device compliant to the protocol is allowed to transmit. Thus, in beacon mode there are no collisions since every device has its own unique communication time slot. For both modes, each packet may start and end with a known sequence of bit waveforms defined by the physical layer specification in the standard shared protocol. For example, the sequence is 64 bits of preamble, 48 bits each of MAC source and destination addresses for the packet, 16 bits of length of the packet, then the actual packet data sequence consistent with the length field, and finally 32 bits of cyclic redundancy check (CRC) error-detecting code.

Normal IEEE 802.3c compliant packets fill the data section with standard format bit waveforms representing the data to be sent, and in the format that is defined in that standard. For example, the length field preceding the data section is a count of how many bytes of data transmitted are to be transmitted during the data section at the bit rate as defined by the common standard. The 802.3 compliant devices know what data length to expect, having decoded the preceding length field, and these transceivers are designed to tolerate receiving noise on the waveform that may corrupt some of the bits in the data. This is why there is a CRC following the data section, in order to check if the noise has corrupted any bits in the data section during transmission. The CRC calculation may be based on all of the bits as received in the data section. The CRC can be designed such that if any bit or bits are decoded in error, that CRC value is very unlikely to match the value calculated on the data when there are no errors. Each receiver may calculate a CRC based on the data as received in the data section, and then check that value against the CRC that is sent in the packet after the data section. If the calculated CRC does not match the received CRC value, the packet can be thrown out and the data is not used. It should also be noted that error correction may be present to correct some number of corrupt bits, but the error correction code (ECC) may only be able to correct a finite number of corruptions and can be overwhelmed by too many corruptions. Thus, the CRC can be a final check after error correction to check that all critical payload data are correct.

Referring now to FIG. 1, shown is a block diagram of an example device and shared media arrangement, in accordance with embodiments of the present invention. In example 100, standard transceivers (e.g., 102-0, 102-1, etc.) and an enhanced transceivers (e.g., 104-0, 104-1, etc.) may be connected to shared media (e.g., Ethernet, twisted-pair, WiFi, etc.). It should be noted that any number of transceivers 102 and 104 can be included on the shared media. Transceivers 102 and 104 may be implemented by an integrated circuit (e.g., custom ASIC, DSP, ADC, DAC, etc.) or other components, but transceivers 104 may have enhanced performance capability, such as an enhanced data rate, and can utilize an enhanced communication protocol. For example, the shared media can include high speed Ethernet standards, such as the IEEE 802.3cg multidrop standard (e.g., for IoT applications and increased bandwidth/data rates). A "multidrop" is a single cable to which multiple devices/nodes can connect without switches, as opposed to point-to-point systems that require switches for network distribution. However, particular embodiments are suitable for the sharing of any single medium between legacy (standard) devices and newer (enhanced) devices, where the newer devices can communicate with each other, while also complying with legacy devices, such as in terms of field length, such that these devices can hold off and not interfere during packet communications. In this way, higher data rates for enhanced devices connected to shared media (e.g., 802.3cg multidrop networks) can be accommodated without negatively affecting the performance of legacy devices.

In particular embodiments, the enhanced protocol can utilize a completely different symbol modulation scheme for the data section, while the preamble and length fields may utilize the given standard symbol modulation scheme, whereby the enhanced protocol is incomprehensible to modems/transceivers that understand only the standard symbol modulation scheme. For example, the Ethernet 802.3 standard protocol uses baseband pulse amplitude symbol modulation (PAM) scheme for sending data, while the enhanced protocol may utilize an orthogonal frequency-division multiplexing (OFDM) or Wavelet symbol modulation scheme. This enhanced protocol may allow for data rate increases by factors of 10 to 100 or more, as compared to the standard protocol (e.g., Ethernet 802.3).

It is also important in some applications that packets that are sent in the format of the enhanced protocol, but received by modems/transceivers that understand only the standard protocol, not be acted upon (e.g., at least to within a very high probability). For example, if the packet of the enhanced protocol was sent to control the operation of a large door with the intent to light a warning light (e.g., in an Internet of things (IoT) application), and the receiver that understood only the standard protocol misinterpreted the data to mistakenly close the door rather than light a warning light, then this could cause serious harm, especially if there were people in the way. Thus in particular embodiments, allowing the increased data rate of the enhanced protocol can also ensure that the CRC as calculated by the modems/transceivers using the standard protocol calculate the CRC as invalid and thus do not act upon data in an enhanced protocol packet. In this way, the intentional CRC corruption as described herein allows use in applications where it is necessary to throw out packets of the enhanced protocol by modems understanding only packets of the standard protocol.

Many standards start with the same preamble format and then signal somewhere in the header to indicate what the format of the data to be sent will be such that the receivers know what to expect, the length portion can be in units compatible with that expected data. However, in certain embodiments, there is no signal in the header to tell the receivers what data format to expect, and the length field that is sent can be timed in units of the expected standard (e.g., slower) data format. In this way, all transceivers conforming to the standard protocol can allow a non-conformant or enhanced transceiver to send more data than would normally be possible without changing the standard and without causing collisions with the slower data packets of the standard protocol.

Particular embodiments are suitable to any type of shared media and communication protocols, such as twisted pair channels using BACNET-MSTP formatted data at 78 kbps as a standard protocol, versus an enhanced protocol with formatted data that can result in a greater than 10× increase in data rate (1 Mbps). Certain embodiments are applicable to communication between devices connected to the same physical media, without limiting devices sharing the same media to either all be compliant to some common standard protocol or risk causing collisions and loss of data. In this way, higher performance communication (e.g., a higher data rate, a longer transmission distance, etc.) can be allowed between enhanced devices without causing a loss of data in standard devices sharing the same physical media but that our not equipped with the enhanced capabilities.

Figure 2:
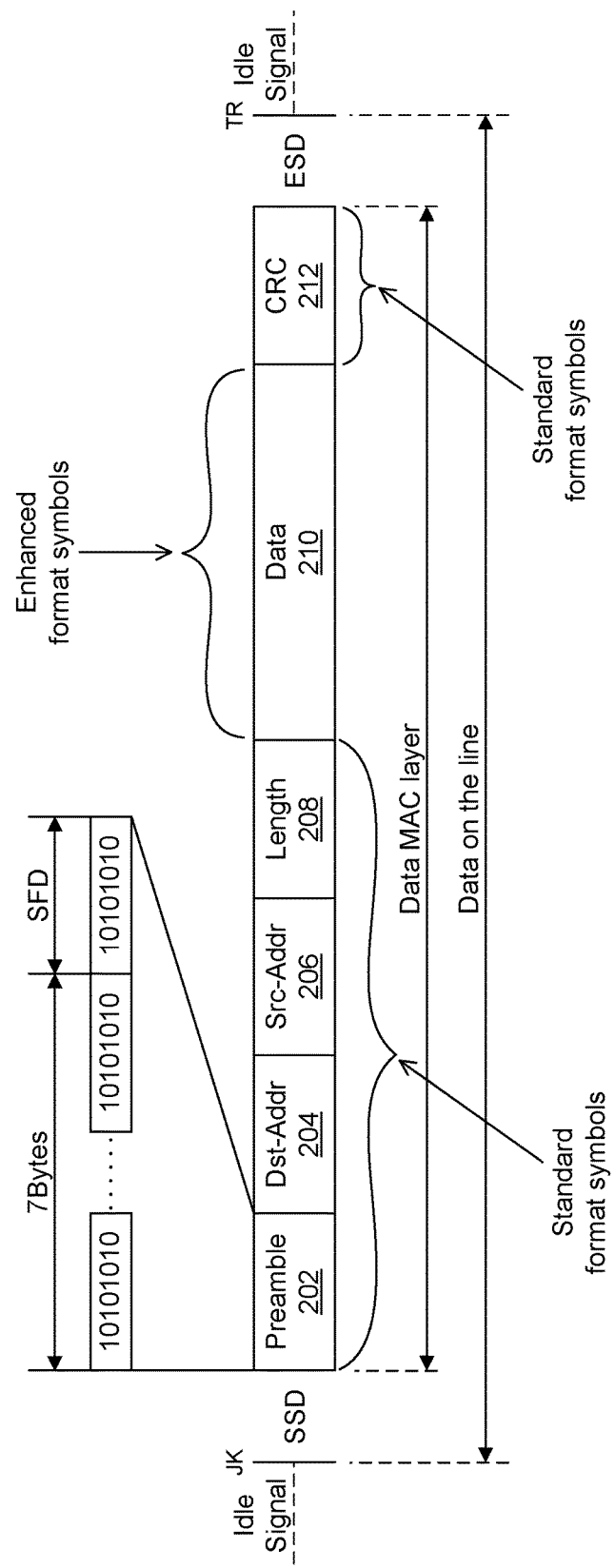
FIG. 2 is a schematic block diagram of an example shared media package with enhanced data section, in accordance with embodiments of the present invention.

Referring now to FIG. 2, shown is a schematic block diagram of an example shared media packet with enhanced data section, in accordance with embodiments of the present invention. In example 200, the IEEE 802.3 MAC frame format is shown, whereby a start-of-stream delimiter (SSD) marks the beginning of the packetized communication, and end-of-stream delimiter (ESD) marks the end of the packetized communication. This example packet can include an (e.g., 8 byte) preamble 202, which may include a (e.g., 1 byte) start frame delimiter (SFD) value that marks the end of the preamble. This can be followed by a (e.g., 6 byte) destination address 204, then by a (e.g., 6 byte) source address 206, and then by a (e.g., 2 byte) length field 208.

In certain embodiments, fields 202, 204, 206, and 208 can all be sent with standard format symbols, e.g., as formatted in accordance with the standard 802.3 specification, whether the sender is a standard or an enhanced device. However, the length field, rather than expressing the true value for how many bytes are in the data section, can instead be a length indication or value that represents approximately the length of time that it would take to send the enhanced data but correlated to how many bytes would be needed using the standard 802.3 specification, in order to occupy essentially the same amount of time. Thus, if 1000 bytes of data are to be sent at 10× the data rate of the 802.3 specification, and it takes 100 data symbols at the 802.3 specified rate to send that 1000 bytes of data at the higher rate, then a value of 100 can be provided in the length field. In this way, the standard specification compliant units/devices would know how long of a data block to expect, and thus can time for this data by using their slower bit clocks.

Modern modem specifications allow for the data section to be corrupted due to noise, which is why a CRC 212 character can be included in order to check the validity of the data. After counting out the proper amount of time in the data section 210, but not decoding the actual data, the standard compliant receivers can correctly read the value of the CRC that is also sent in the standard format. However, the CRC sent would, with a very high likelihood, not match the CRC calculated using the misread data, thus invalidating the data for those non-compliant units. As such, the length value can be modified in order to represent the number of standard format symbols to fit the enhanced data waveforms that utilize enhanced format symbols. Further, the CRC as set in field 212 can be a purposefully incorrect value (e.g., a random number or known/different number) that results in an enhanced packet being discarded by standard devices. For example, prime or other numbers can be utilized in generating CRC values.

In particular embodiments, a higher performance waveform (enhanced) can be substituted for the data section (e.g., 210), while standard symbol/waveforms can be employed for the other packet sections (e.g., 202, 204, 206, 208, and 212), such that other transceivers can allow the transmission without colliding with its data section. First, length field 208 may be formed by calculation of the length of the high speed data section and of the corresponding equivalent length at the standard slower speed. This modified slower speed length value can then be sent in the standard specific communication protocol MAC length field 208. The data in the high speed format that fits into the length as specified for the data section can be sent in data section 210.

Following the data section, the CRC value that does not match what was expected in the standard format by standard receivers can be provided at CRC 212. The first bit of this CRC value may be time-aligned in order to match the expected timing given the expected length value in 208 that was sent to standard (e.g., 802.3cg) compliant devices. If the CRC does not match the predicted value from the data packet, such as for a standard device receiving an enhanced data section, the packet can be thrown out by the receiving device.

Figure 3:
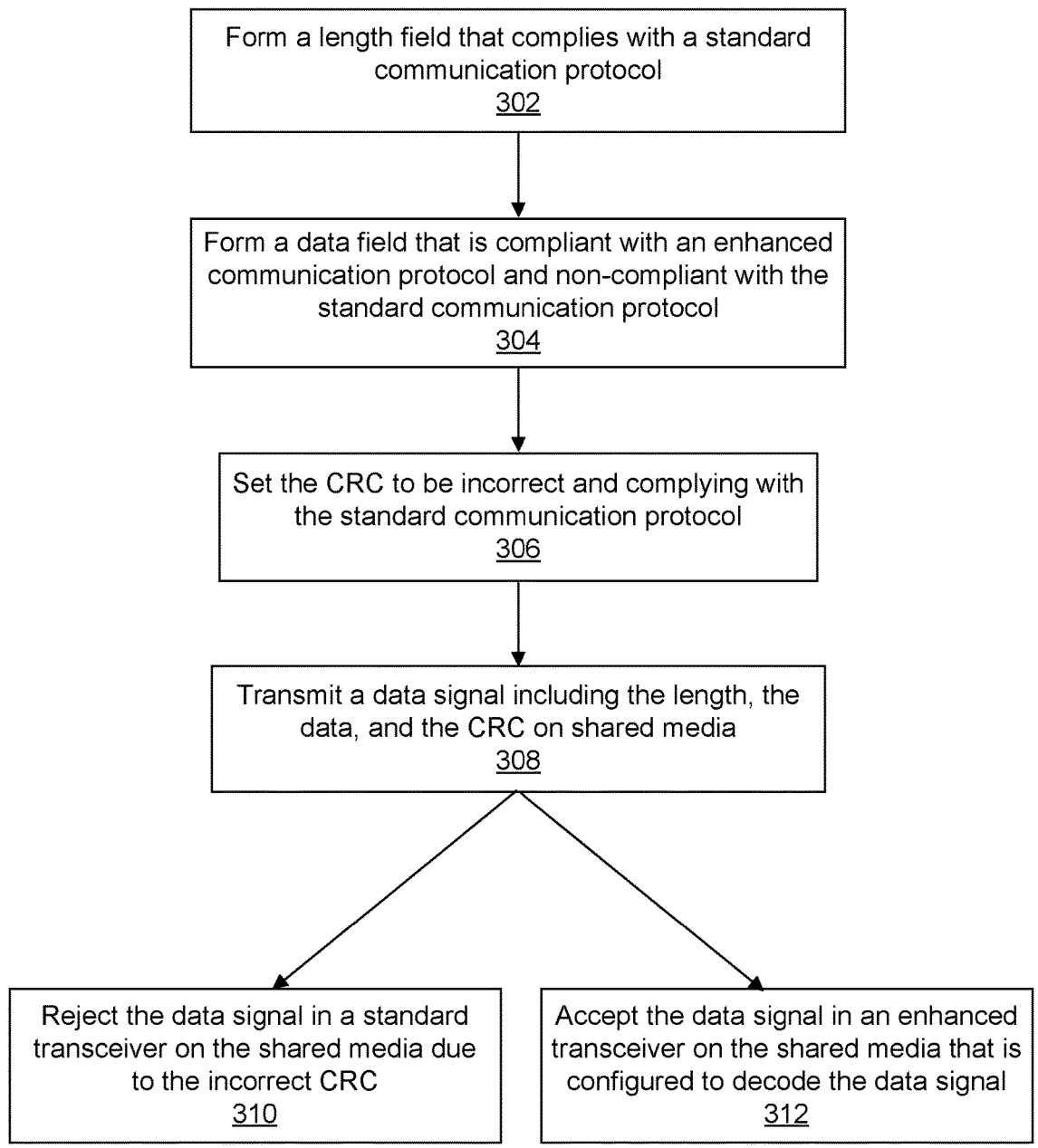
FIG. 3 is a flow diagram of an example method of communicating between devices on a shared media, in accordance with embodiments of the present invention.

Referring now to FIG. 3, shown is a flow diagram of an example method of communicating between devices on a shared media, in accordance with embodiments of the present invention. In example 300, a length field that complies with a standard communication protocol can be formed at 302. At 304, a data field that is compliant with an enhanced communication protocol, and non-compliant with the standard communication protocol, can be formed. As discussed above, different symbols/waveforms may characterize the enhanced communication protocol relative to the standard communication protocol. At 306, the CRC can be set to be an incorrect value but otherwise complying with the standard communication protocol. At 308, the data signal including the length, the data, and the CRC can be transmitted on the shared media. At 310, a standard transceiver that complies with the standard communication protocol may reject the data signal due to the incorrect CRC with respect to the data section as received by that standard transceiver. At 312, an enhanced transceiver may properly decode the data signal.

Particular embodiments take advantage of the fact that transceivers are tolerant of bit errors in the data section. The standard IEEE 802.3cg waveforms can be sent up until the data section (e.g., in the preamble 202, destination address 204, source address 206, and length 208 fields). Thus, all devices on the shared media can decode the addresses and the expected length of the data section, since they understand the standard communication protocol. Then, rather than sending the slower 802.3cg waveform in the data section, a completely different type of waveform that holds more data bits than 802.3, but can be accommodated in that designated length of time, can be provided in the data section. Thus, how long the high speed data section would be and what that equivalent length is at the standard slower speed can be calculated. In some cases, the length value might be slightly longer than it takes to send the higher speed data to insure that the bit timing edges for the field that follows the data field aligns properly with the expected lower speed bit stream. In any event, the slower speed length value can be sent in the MAC length portion of the packet such that all standard protocol (e.g., 802.3) devices can be made aware of when the data section will end, even though such devices are not equipped to properly decode the enhanced data section.

Following the data section, the CRC value can be sent in the standard format, but with a value that will not match what was expected with a very high probability for standard receivers. For example, a random 32 bit number could be used since the chance of that number matching the value calculated by transceivers without the ability to decode the higher speed data is 1 in 4 billion. In some cases, the random number may not be fully random, but rather a known/different number. The first bit of this length value can be time-aligned to match the expected timing given the expected length value sent to standard/802.3cg compliant devices. Thus, although the 802.3cg devices lack the ability to properly decode the enhanced data section, they can properly decode the CRC and discard the incoming packet based on the incorrect CRC value. This would not represent a loss of data, however, since this packet would not have been addressed to devices that could not properly receive the more advanced waveform in any event.

The communication application may only send the advanced higher speed mode packets to devices in the system that are known to have the capability to decode such packets. Initially, in order to find out which devices on the shared media are enhanced, enhanced packets may be sent to all devices with the expectation that responses would only be received from enhanced devices, and standard devices would not respond. In any event, the standard 802.3 devices can effectively ignore the enhanced data in these cases due to the addressing mismatch, and regardless of the incorrect CRC value. Further, the MAC addresses can be sent in the slower/standard format that all devices on the shared media are capable of decoding properly. In this way, higher performance proprietary transceivers can be implemented to be deployed alongside already accepted 802.3 standard transceivers without loss of data. Such an enhanced transceiver can communicate with all the standard 802.3 devices at the standard slow speed, but can also communicate faster to devices that have this enhanced transceiver capability.

Figure 4:
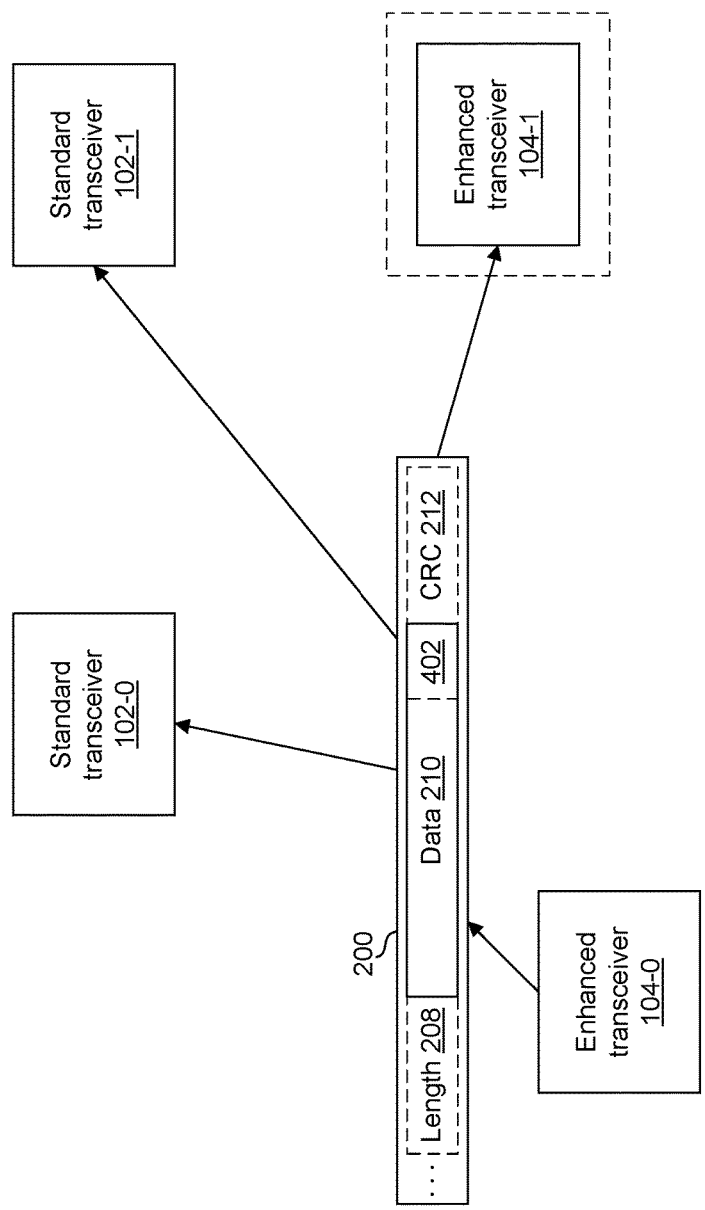
FIG. 4 is a diagram of an example communication between device on shared media, in accordance with embodiments of the present invention.

Referring now to FIG. 4, shown is a diagram of an example communication between device on shared media, in accordance with embodiments of the present invention. In example 400, packet 200 is shown as being sent via a multidrop network to standard transceivers 102 and enhanced receivers 104. In this particular example, enhanced transceiver 104-0 can send packet 200, which can be discarded by standard transceivers 102-0 and 102-1, but understood and decoded by enhanced transceiver 104-1. Generally, an enhanced transceiver 104 can send a packet to other enhanced receivers using enhanced/high rate modulation, but the standard transceivers 102 would throw out such packets due to incorrect CRC values. Enhanced transceiver 104 can also send packets to standard transceivers 102 using low rate modulation, and these packets would be acceptable. As such, standard transceivers can communicate with each other and/or with enhanced transceivers using low rate modulation, but high rate modulation can effectively be reserved for enhanced transceivers.

While the CRC value in CRC section 212 of packet 200 can be set to be incorrect such that standard transceivers 102-0 and 102-1 will ignore the packet, this incorrect CRC value should not result in the packet being discarded by its intended target (e.g., enhanced transceiver 104-1). In some cases, a second CRC value that is in the enhanced communication format can be included at the end of data section 210 in designated portion 402. In other cases, the CRC value in portion 212 may be understood as correct by the enhanced transceivers, and as incorrect by the standard transceivers. In this way, a CRC value can be understood and correctly set such that enhanced transceivers 104 may be able to properly decode and accept the packet data. In particular embodiments, a variety of approaches (see, e.g., FIGS. 5 and 6) can be employed in order to create a CRC value that with high probability will calculate to be wrong for the lower data rate default transceiver (e.g., 102) and a CRC value that will be correct for the high rate data received by the high rate receiver (e.g., 104), assuming the data and CRC are received without actual errors.

Figure 5:
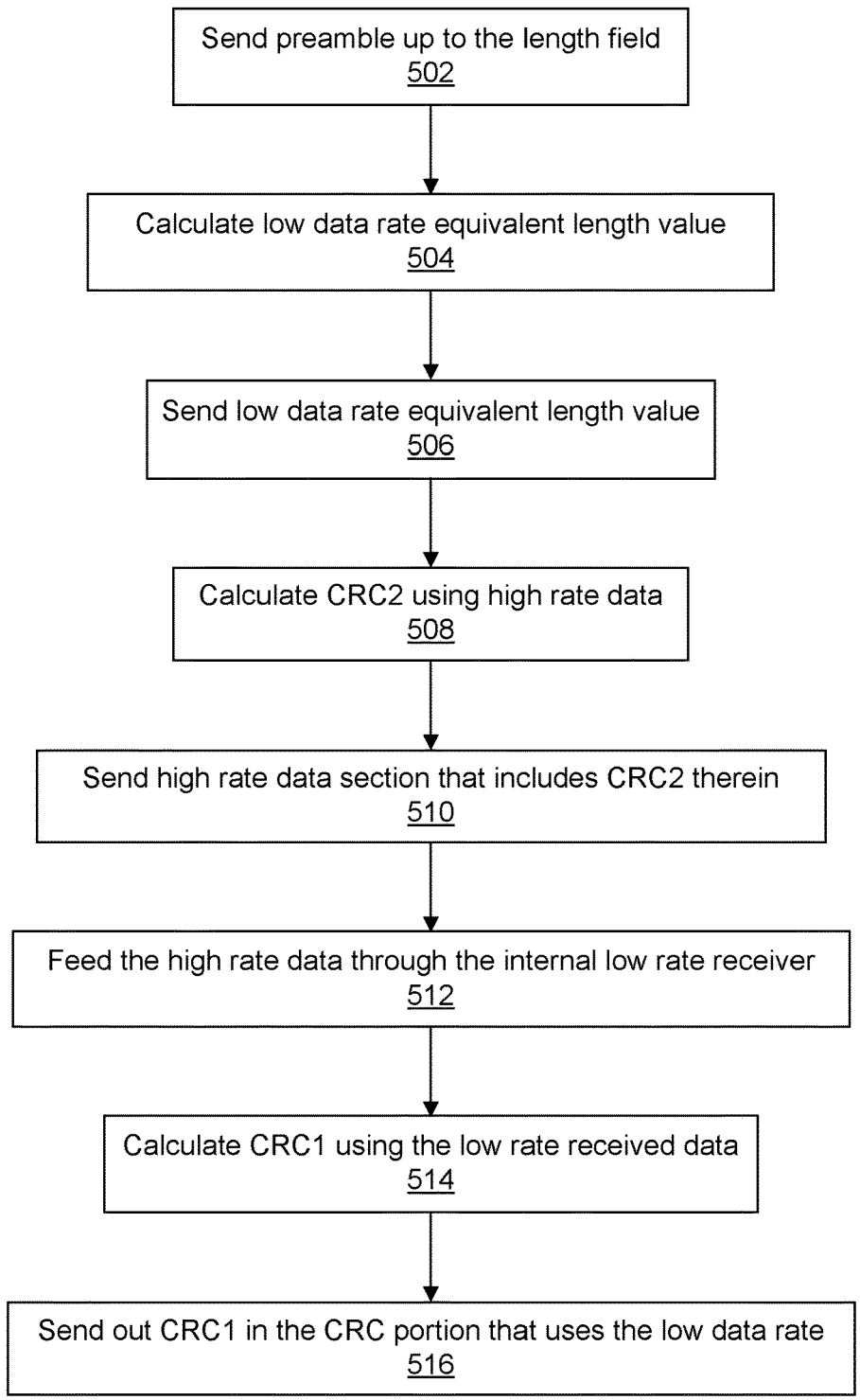
FIG. 5 is a flow diagram of a first example error check character formation, in accordance with embodiments of the present invention.

Referring now to FIG. 5, shown is a flow diagram of a first example error check character formation, in accordance with embodiments of the present invention. In example 500, the preamble up to the length field can be sent at 502. At 504, a low data rate equivalent length value can be calculated. At 506, a low data rate equivalent length value can be sent. At 508, a CRC2 can be calculated using high rate data. At 510, the high rate data section that includes CRC2 (e.g., in portion 402) therein can be sent. At 512, the high rate data may be fed through the internal low rate receiver on the transceiver device, as the enhanced transceivers may include both standard/slow and enhanced/fast operational capability and appropriate circuitry therein. At 514, a CRC1 can be calculated using the low rate received data. At 516, CRC1 can be sent in the CRC portion that uses the low data rate.

Accordingly, the advanced transceivers may feed the advanced higher rate data waveform into its own low data rate receiver. Thus, the higher rate data would be interpreted incorrectly because the low data rate receiver may not understand the higher data rate waveforms, but incorrectly in the same way that the other lower rate transceivers (e.g., 102) may interpret the data using their low data rate receivers. Then, the enhanced sending transceiver can calculate the "correct" CRC based on that same incorrect data all the low data rate transceivers receive, and choose to send a different (incorrect) CRC (e.g., in 212) than the "correct" one it calculated. Since all standard transceivers 102 decoding the high rate data may arrive at the same "correct" CRC as the enhanced transmitter, they can interpret a mismatch between their calculated CRC and the different (incorrect) CRC value as sent. As such, the standards transceivers may discard the packet. A second high rate CRC can be calculated from the high rate data, and sent with therewith in the high rate data section (e.g., in 402). It should be noted that an "error check character" as used herein can include any suitable number of bits (e.g., 8-bits, 16-bits, 32-bits, etc.).

Figure 6:
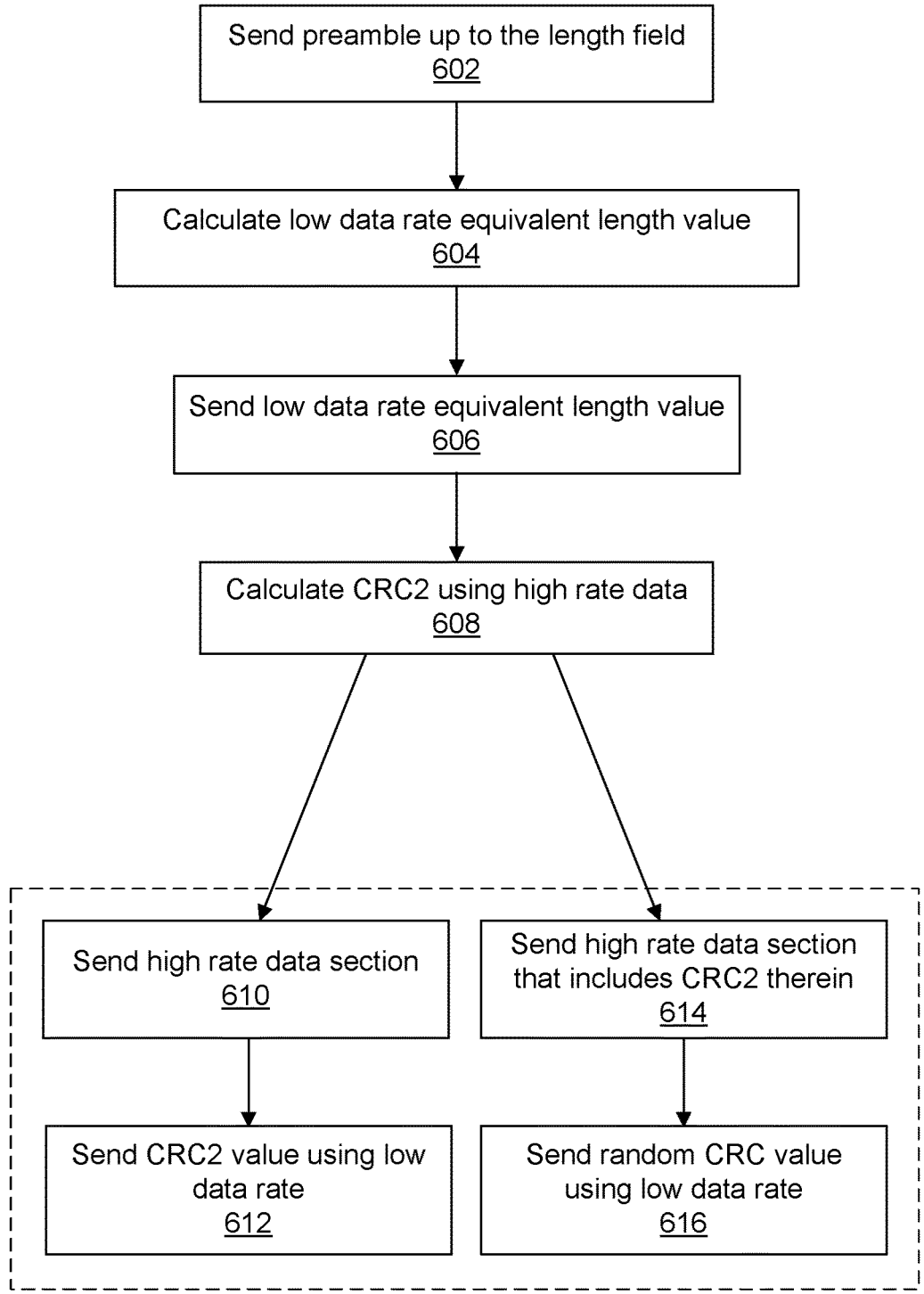
FIG. 6 is a flow diagram of a second example error check character formation, in accordance with embodiments of the present invention.

Referring now to FIG. 6, shown is a flow diagram of a second example error check character formation, in accordance with embodiments of the present invention. In example 600, the preamble up to the length field can be sent at 602. At 604, a low data rate equivalent length value can be calculated. At 606, a low data rate equivalent length value can be sent. At 608, a CRC2 can be calculated using high rate data. At 610, the high rate data section can be sent. At 612, the CRC2 value can be sent using the low data rate (e.g., in 212). In this way, a high rate CRC can be calculated from the high rate data, but sent in the low rate data section (e.g., in 212). CRC algorithms are specifically chosen such that there is a very low probability that different sets of data would produce the same CRC value. Thus, if the CRC that is sent at the low data rate was calculated using the high rate data, it can very likely have a different value than that as calculated by a default/standard transceiver's interpretation of the high rate data as seen by its low rate receiver. Therefore, the high data rate transceiver can send the CRC value as calculated from the high rate data with confidence that transceivers with only the low rate receiver may discard the packet due to a mismatched CRC, while transceivers with the high rate receiver can receive this CRC that is consistent with the high rate data and not throw the packet away if the data and CRC were not corrupted.

In another approach, a random CRC value or otherwise known/different number can be utilized for the incorrect CRC value. For example, at 614, the high rate data section that includes CRC2 therein (e.g., in portion 402) can be sent, and at 616, a random CRC value can be sent using the low data rate (e.g., in portion 212). If the CRC is long, such as 32 bits, and if a random 32 bit number is chosen for the low rate CRC value, the probability of it calculating to be the correct value for the data is less than 1 in 4 billion. In this way, a purposefully incorrect CRC value can be sent in the low data rate portion (e.g., 212), while a second high rate CRC can be calculated from the high rate data and sent with in the high rate data section (e.g., 402) of the packet to allow enhanced transceivers 104 to properly decode the data.

Figure 7:
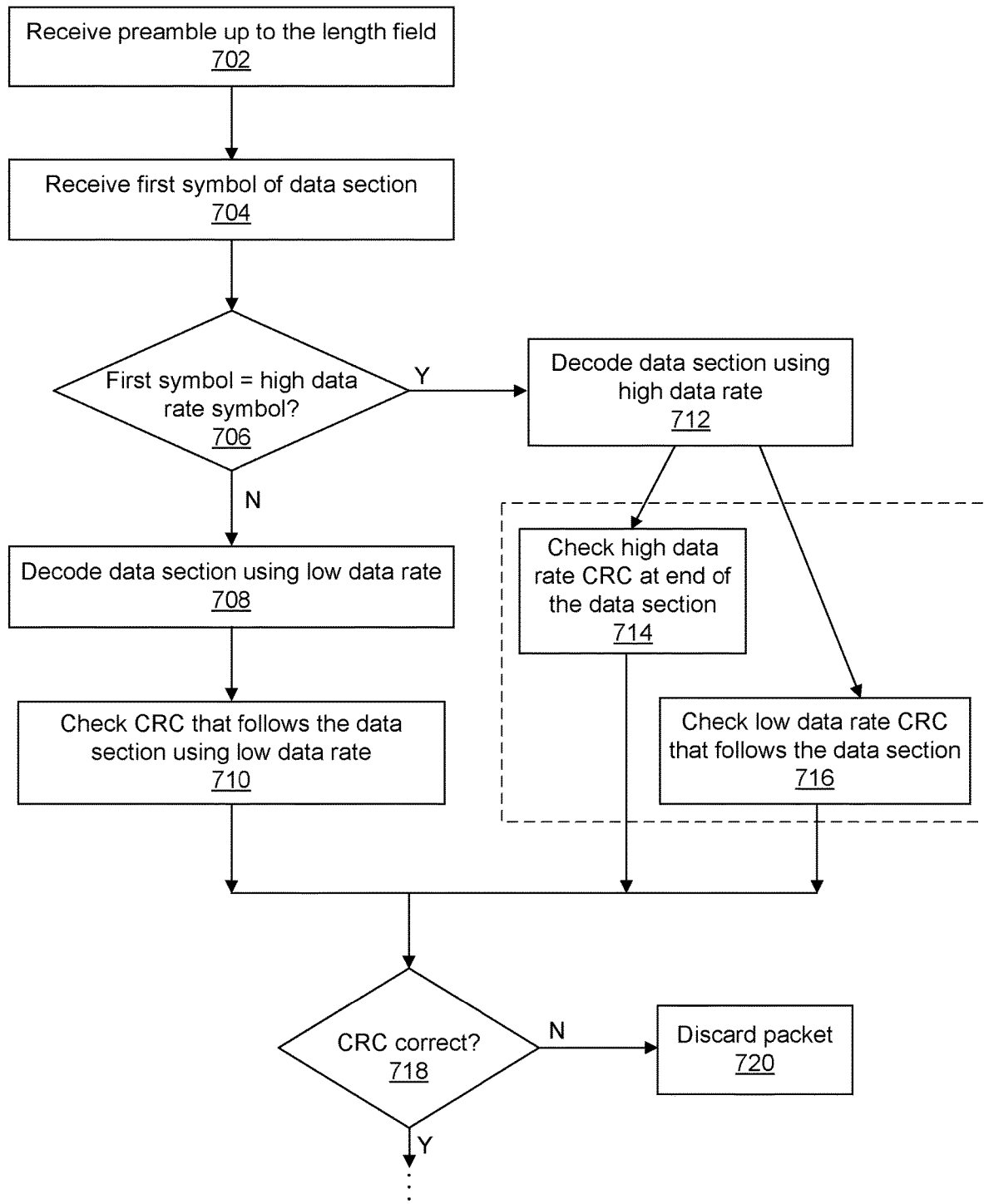
FIG. 7 is a flow diagram of an example packet receive operation for an enhanced transceiver, in accordance with embodiments of the present invention.

Referring now to FIG. 7, shown is a flow diagram of an example packet receive operation for an enhanced transceiver, in accordance with embodiments of the present invention. In example 700, the preamble up to the length field/portion can be received at 702. At 704, the first symbol of the data section can be received. At 706, the first symbol can be checked to determine if the symbol is a high or low data rate symbol. If the first symbol is a low data rate symbol, the data section can be decoded using the low data rate at 708. Also, at 710, the CRC following the data section (e.g., in portion 212) can be checked using the low data rate. If the CRC is determined to be incorrect at 718, the packet may be discarded at 720; otherwise, processing may continue. If the first symbol is a high data rate symbol/waveform, the data section can be decoded using the high data rate at 712. At 714, the high data rate CRC at end of the data section (e.g., in portion 402) can be checked. At 716, the low data rate CRC that follows the data section (e.g., in portion 212) can be checked. If the CRC is determined to be incorrect at 718, the packet may be discarded at 720; otherwise, processing may continue.

Particular embodiments can be applied to many standards in addition to 802.3cg, thus allowing higher performance communication on the same media without causing loss of data. Many, if not most, standards follow this general model where the length is sent before the data. For example, BACNET-MSTP on twisted pairs and IEEE709.2 for communication over the powerline both send the length, then the data, then the CRC. Particular embodiments may apply to any communication standard that specifies that the length of the data section be sent before the data section is sent. For some protocols, such as 802.11 (i.e., WiFi), both the length and CRC fields are sent before the data payload, and this can also be accommodated in certain embodiments. In any event, information other than the data payload can be sent in the standard format, while the data itself may be sent in the enhanced format, regardless of where the CRC portion is sent. Particular embodiments are suitable for any physical communication media (e.g., twisted pair, radio frequency, coaxial, etc.) so long as the protocol of the transceivers using this shared media specifies that the length of the data segment, when required to be sent by the particular protocol, is sent before the data segment.

For some protocols, the length field may actually not be sent at all. In these cases, another mechanism can be used so that receivers are made aware that the data section has ended. For example, some protocols may require checking that signals are currently being sent by looking at, e.g., whether there are baseband transitions occurring at a high enough rate. For other protocols, the data format may require high frequency carriers to be present and in which case the receiver may sense when the carriers go away to know that is the end of the data section. Both the transition detection and the carrier detection can be termed "carrier sensing." For these protocols, data can be decoded until the data symbols stop being sent, sometimes described as the carrier going away. For such cases, a slightly different technique may be utilized in order to send alternate format data to keep the standards based devices from transmitting. In certain embodiments, the beginning of the packet before the data section can be sent in the standard format up until the data section. Then, the enhanced format data section may be substituted in during the data section portion of the packet. When the data is complete, then any other symbols expected after the data section can accordingly be sent in the specified format, which can include a CRC value, and may be time-aligned with the expected specified symbol boundaries. In these cases, the enhanced format physical symbols can be interpreted by the standard format receivers as having carrier present.

Particular embodiments may be suitable to any communication protocols, whereby some devices on the shared media are only able to understand a subset of the possible communication thereon, while other devices can understand a wider range of communication waveforms/symbols. In one example of multidrop Ethernet, the IEEE 802.3cg 10 Mbits/sec mode (standard format) can be enhanced by using something similar or the same as IEEE 1901 (enhanced format) for the data section, which has data rates ranging from 90 Mbits/sec to 1 Gbit/sec, which can result in a substantially increased (e.g., 10× or more) data rate. Thus, advantages of particular embodiments include enabling implementation of higher performance proprietary transceivers that can be deployed on the same shared physical media (e.g., 802.3) as standard transceivers, without loss of data. This enhanced mode transceiver may have the ability to communicate with all the standard 802.3 devices at the standard slow speed, but also with higher performance (e.g., higher data rate) devices that have this enhanced mode transceiver capability.

While the above examples include circuit, operational, and structural implementations of certain memory arrangements and devices, one skilled in the art will recognize that other technologies and/or architectures, as well as other modes of operation, can be used in accordance with embodiments. Further, one skilled in the art will recognize that other device circuit arrangements, architectures, elements, and the like, may also be used in accordance with embodiments. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of communication on a shared media having a plurality of devices coupled thereto, the method comprising:
   a) forming a first portion comprising information on a property of a data signal and complying with a communication protocol;
   b) forming a second portion comprising data that differs from the information on the property provided in the first portion, wherein the second portion is non-compliant with the communication protocol;
   c) forming a third portion comprising a first error check character to verify that the data signal is error free, wherein the first error check character is purposefully set to be an incorrect value and otherwise complying with the communication protocol; and
   d) transmitting the data signal comprising the first, second, and third portions on the shared media, whereby a first of the plurality of devices that complies with the communication protocol is configured to reject the data signal due to the first error check character, and a second of the plurality of devices is configured to decode the data signal.

2. The method of claim 1, wherein:
   a) the first device comprises a standard transceiver that is configured to support the communication protocol; and
   b) the second device comprises an enhanced transceiver that is configured to support the communication protocol and an enhanced communication protocol.

3. The method of claim 2, wherein the first and third portions are transmitted using the standard communication protocol, and the second portion is transmitted using the enhanced communication protocol.

4. The method of claim 1, wherein the property of the data signal comprises a data rate, and the information on the property comprises a length indication.

5. The method of claim 1, wherein the forming the third portion comprises calculating the first error check character using an enhanced rate data.

6. The method of claim 1, wherein:
   a) the forming the second portion comprises calculating a second error check character using an enhanced rate data; and
   b) the forming the third portion comprises calculating the first error check character by feeding the data through a standard rate receiver.

7. The method of claim 1, wherein:
   a) the forming the second portion comprises calculating a second error check character using an enhanced rate data; and
   b) the first error check character comprises a random number.

8. The method of claim 1, wherein in the second device, the method further comprises:
   a) receiving a first symbol of the data section; and
   b) determining whether the first symbol is a low data rate or a high data rate symbol.

9. The method of claim 8, wherein when the first symbol is the low data rate, further comprising:
   a) decoding the data section with the low date rate; and
   b) checking the error check character in the third portion.

10. The method of claim 8, wherein when the first symbol is the high data rate, further comprising decoding the data section with the high date rate.

11. The method of claim 10, further comprising checking the first error check character in the third portion.

12. The method of claim 10, further comprising checking a second error check character in the second portion.

13. An apparatus for communication on a shared media having a plurality of devices coupled thereto, the apparatus being configured to:
   a) form a first portion comprising information on a property of a data signal and complying with a communication protocol;
   b) form a second portion comprising data that differs from the information on the property provided in the first portion, wherein the second portion is non-compliant with the communication protocol;
   c) form a third portion comprising a first error check character to verify that the data signal is error free, wherein the first error check character is purposefully set to be an incorrect value and otherwise complying with the communication protocol; and
   d) transmit the data signal comprising the first, second, and third portions on the shared media, whereby a first of the plurality of devices that complies with the communication protocol is configured to reject the data signal due to the first error check character, and a second of the plurality of devices is configured to decode the data signal.

14. The apparatus of claim 13, wherein:
   a) the first device comprises a standard transceiver that is configured to support the communication protocol; and
   b) the second device comprises an enhanced transceiver that is configured to support the communication protocol and an enhanced communication protocol.

15. The apparatus of claim 14, wherein the first and third portions are transmitted using the enhanced communication protocol, and the second portion is transmitted using the standard communication protocol.

16. The apparatus of claim 13, wherein the property of the data signal comprises a data rate, and the information on the property comprises a length indication.

17. The apparatus of claim 13, wherein formation of the third portion comprises calculating the first error check character using an enhanced rate data.

18. The apparatus of claim 13, wherein:
   a) formation of the second portion comprises calculating a second error check character using an enhanced rate data; and
   b) formation of the third portion comprises calculating the first error check character by feeding the data through a standard rate receiver.

19. The apparatus of claim 13, wherein:
   a) formation of the second portion comprises calculating a second error check character using an enhanced rate data; and
   b) the first error check character comprises a random number.

20. The apparatus of claim 13, wherein the second device is configured to:
   a) receive a first symbol of the data section;
   b) determine whether the first symbol is a low data rate or a high data rate symbol;
   c) decode the data section with the low date rate, and check the error check character in the third portion, when the first symbol is the low data rate;
   d) decode the data section with the high date rate when the first symbol is the high data rate; and
   e) check the first error check character in the third portion, or check a second error check character in the second portion.

* * * * *